Nov. 16, 1954  J. A. HJULIAN  2,694,349
METHOD FOR PRODUCING CEMENT PIPES
Filed June 25, 1949  8 Sheets-Sheet 4
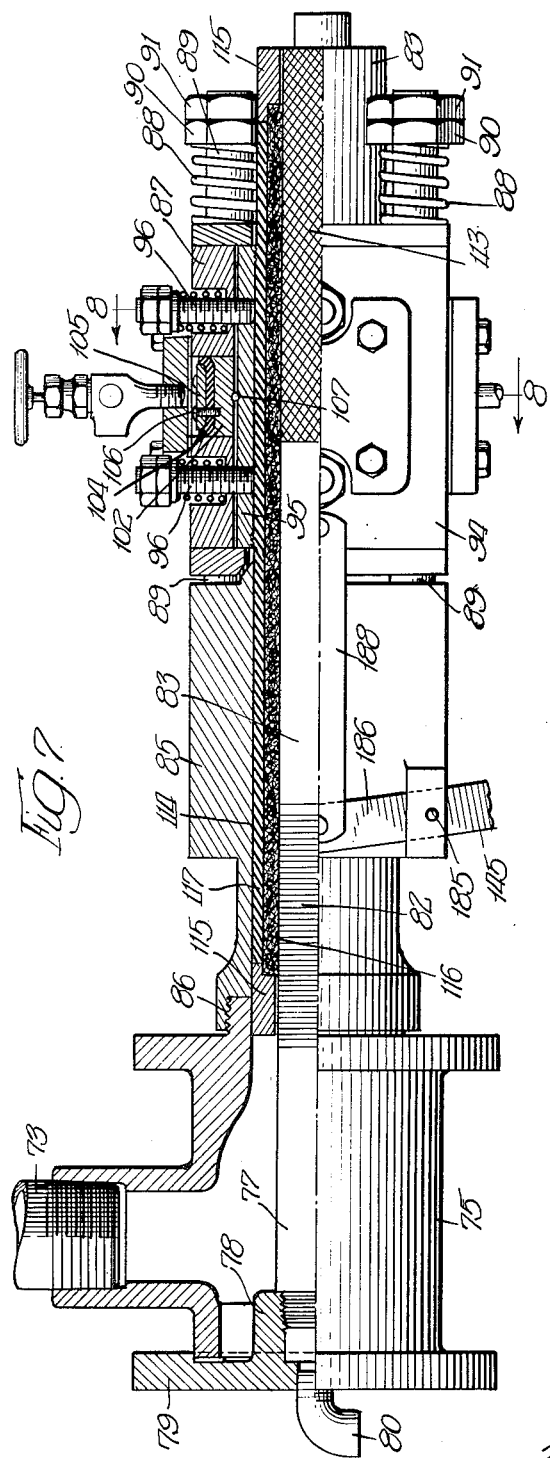
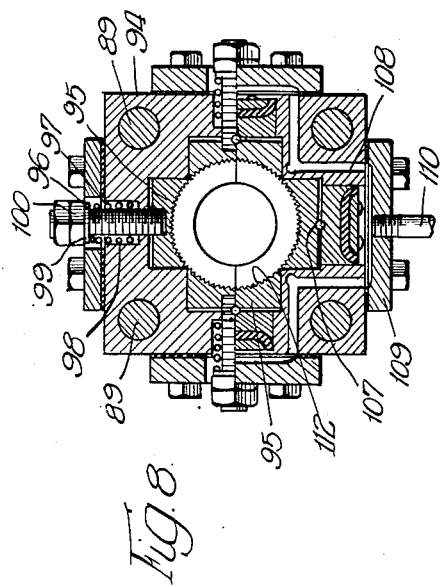
INVENTOR.
Julius A Hjulian,
BY
Wilkinson Huxley Byron Hume
attys.

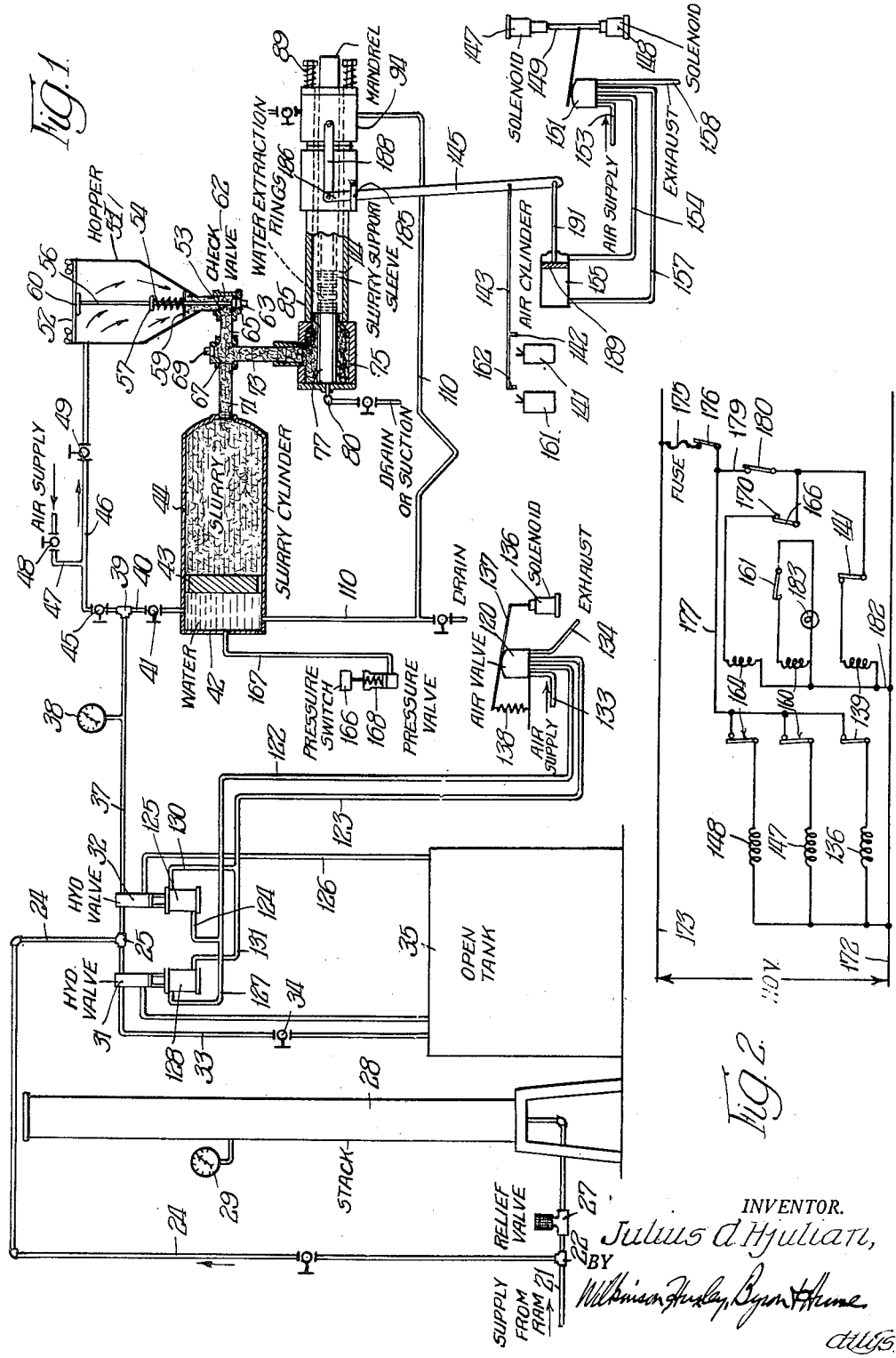

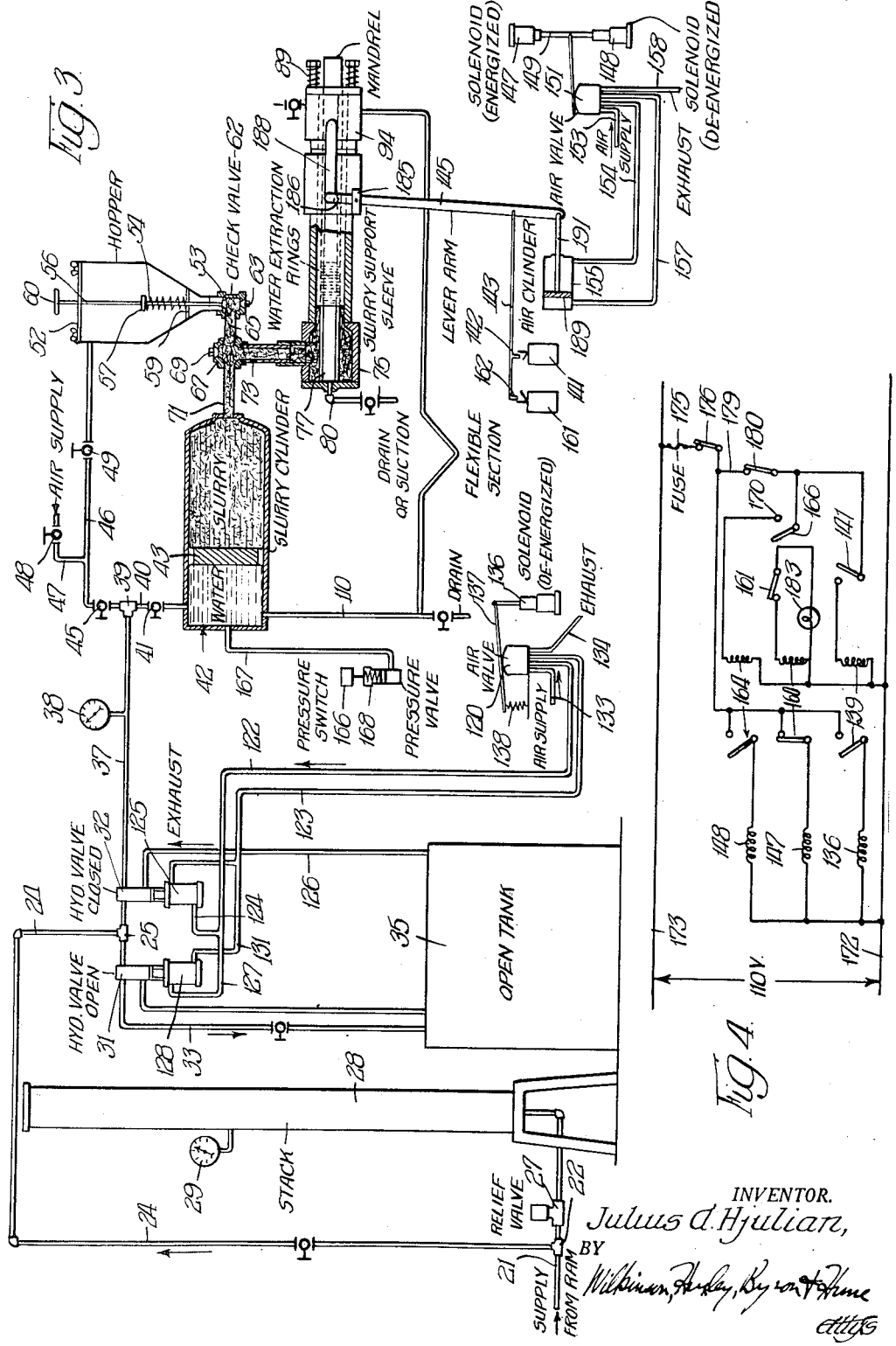

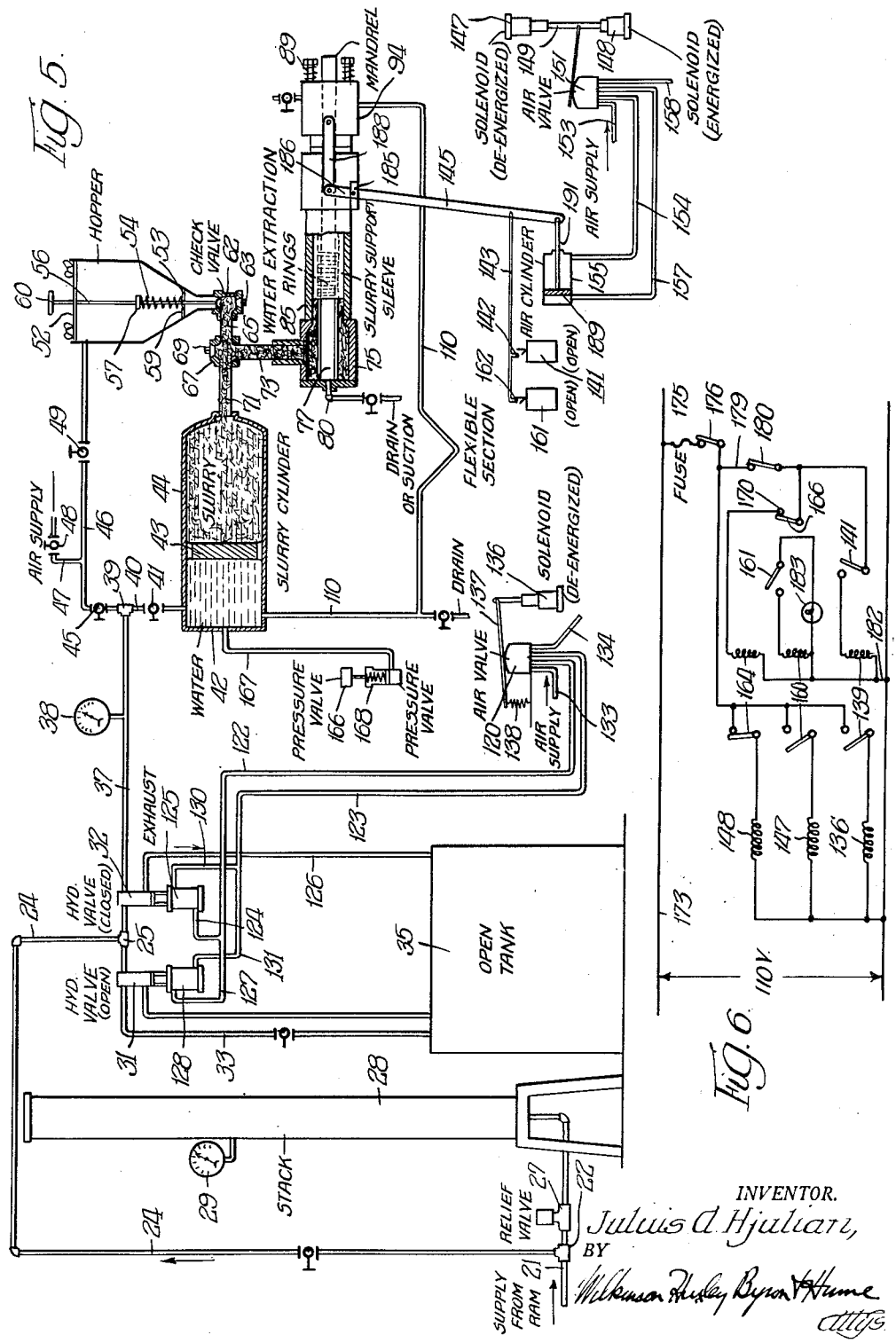

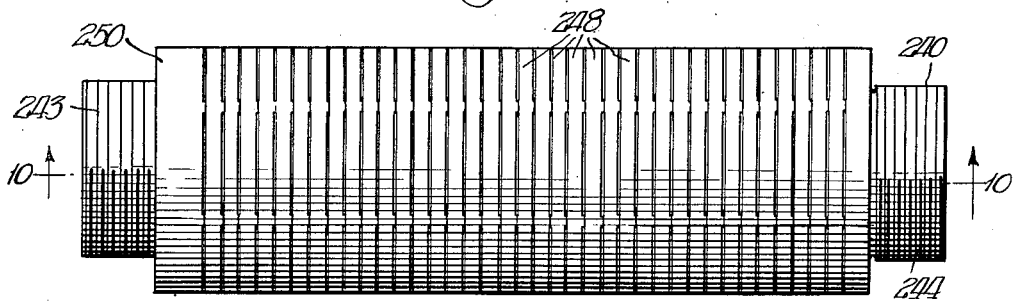
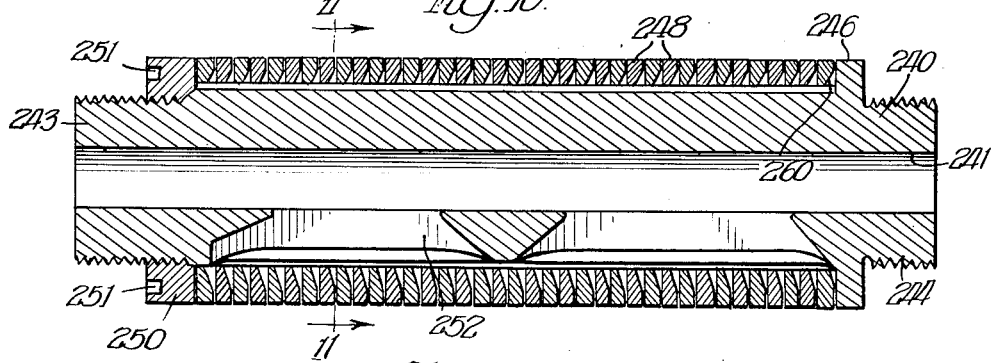
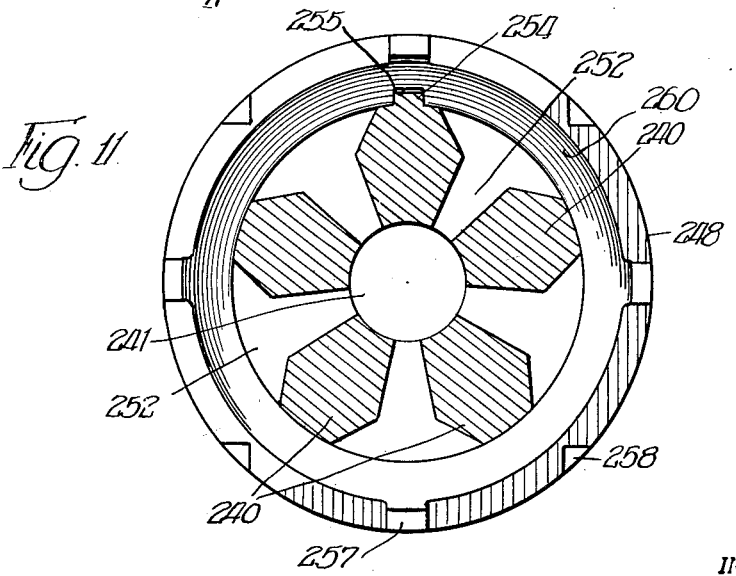

Nov. 16, 1954 — J. A. HJULIAN — 2,694,349
METHOD FOR PRODUCING CEMENT PIPES
Filed June 25, 1949 — 8 Sheets-Sheet 6

INVENTOR.
Julius A. Hjulian,
BY

Nov. 16, 1954    J. A. HJULIAN    2,694,349
METHOD FOR PRODUCING CEMENT PIPES
Filed June 25, 1949    8 Sheets-Sheet 7

INVENTOR.
Julius A. Hjulian,
BY

Nov. 16, 1954    J. A. HJULIAN    2,694,349
METHOD FOR PRODUCING CEMENT PIPES
Filed June 25, 1949    8 Sheets-Sheet 8
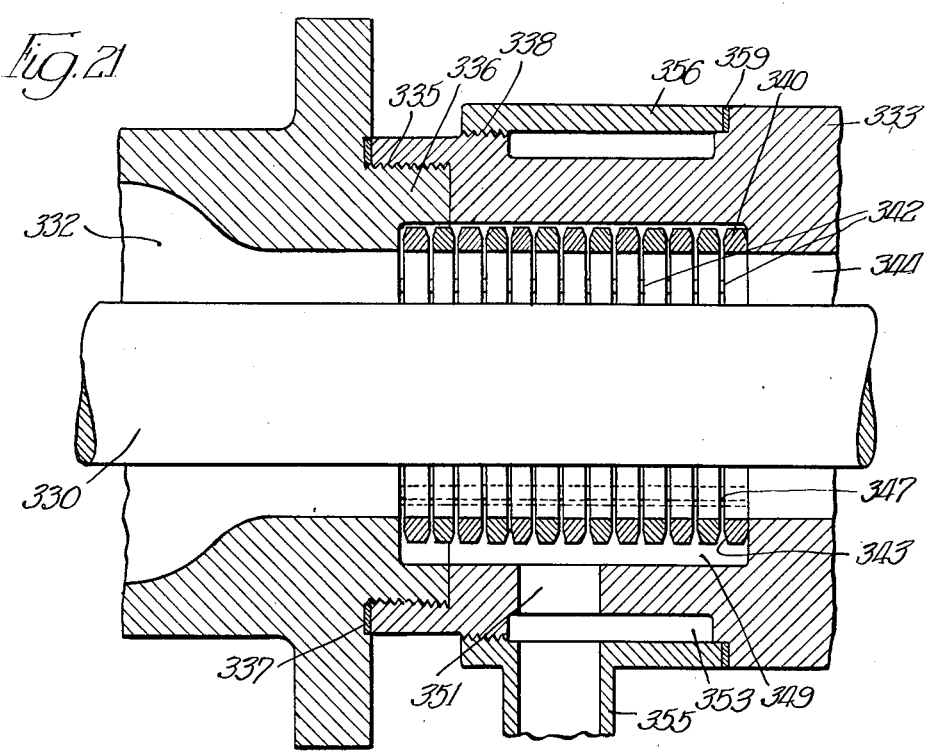
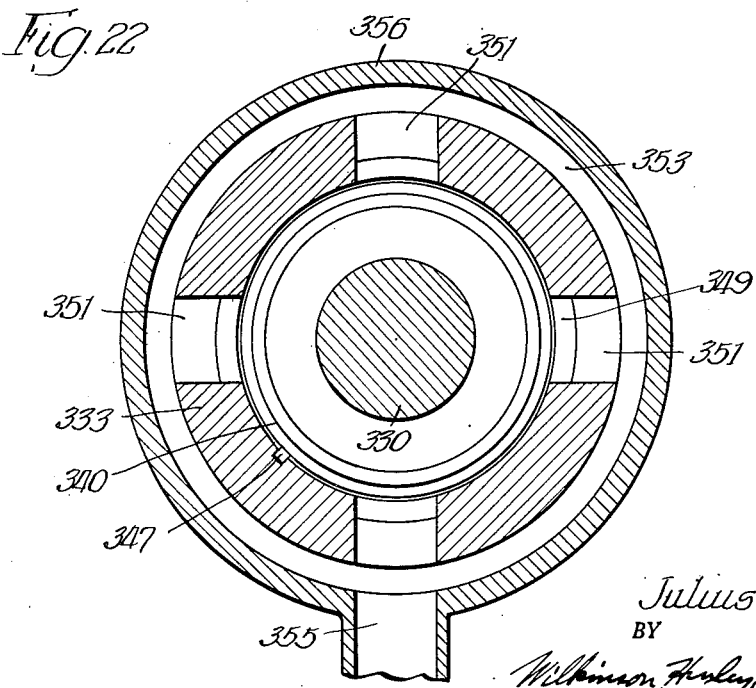
INVENTOR.
Julius A. Hjulian,
BY
Wilkinson, Huxley, Byron & Hume
ATTYS.

United States Patent Office 2,694,349
Patented Nov. 16, 1954

2,694,349

METHOD FOR PRODUCING CEMENT PIPES

Julius August Hjulian, Palos Heights, Ill., assignor to Crane Co., Chicago, Ill., a corporation of Illinois Application June 25, 1949, Serial No. 101,346

7 Claims. (Cl. 92—59)

This invention relates to a new and improved method and apparatus for the production of pipe formed from cement and a suitable aggregate. In its preferred form, this aggregate comprises asbestos fibre.

The method and apparatus relate to the production of pipe by an extrusion process under relatively high pressure so that the pipe has high density and great strength. While the pipe is extruded, means are provided whereby the extrusion is resisted in such manner that the high pressures may be applied and a large proportion of uncombined water may be eliminated from the slurry during the process. The method and apparatus are adapted to produce continuous lengths of pipe, the possible length being unlimited as far as the method and apparatus are concerned.

It is an object of the present invention to provide a new and improved method and apparatus for the production of cement-asbestos pipe or the like.

It is a further object to provide a method and apparatus by which continuous lengths of hard, dense pipe may be produced.

It is also an object to provide a method and apparatus by means of which the pipe may be extruded under high pressures.

It is another object to provide means and methods whereby the extrusion of the pipe is resisted during the application of pressure and whereby the movement of the pipe may be intermittent or substantially continuous.

It is an additional object to provide an apparatus which is automatic in operation in carrying out the several steps in the formation and intermittent movement of the extruded pipe.

It is a further object to provide apparatus of this character including means for the elimination of a high percentage of water from the slurry during the formation of the pipe with the loss of only a small percentage of the solids in the slurry.

It is also an object to provide a method and apparatus for the commercial production of pipe of high quality and adapted for practical use.

Other and further objects will appear as the description proceeds.

I have shown certain preferred embodiments of my invention in the accompanying drawings, in which—

Figure 1 is a somewhat diagrammatic layout of the apparatus together with the control mechanism;

Figure 2 is a circuit diagram with control switches, relays and solenoids in positions corresponding to the apparatus positions of Figure 1;

Figure 3 is a diagrammatic layout similar to Figure 1 but showing a further step in the operation;

Figure 4 is a circuit diagram corresponding to Figure 3;

Figure 5 is a diagrammatic layout similar to Figures 1 and 3 but showing a later step in the process;

Figure 6 is a circuit diagram corresponding to Figure 5;

Figure 7 is a view partly in section and on an enlarged scale showing the pipe forming portion of the apparatus;

Figure 8 is a cross-section taken on line 8—8 of Figure 7;

Figure 9 is an elevation, on an enlarged scale, of the water-extraction cylinder;

Figure 10 is a section taken on line 10—10 of Figure 9;

Figure 11 is an enlarged cross-section taken on line 11—11 of Figure 10;

Figure 12:
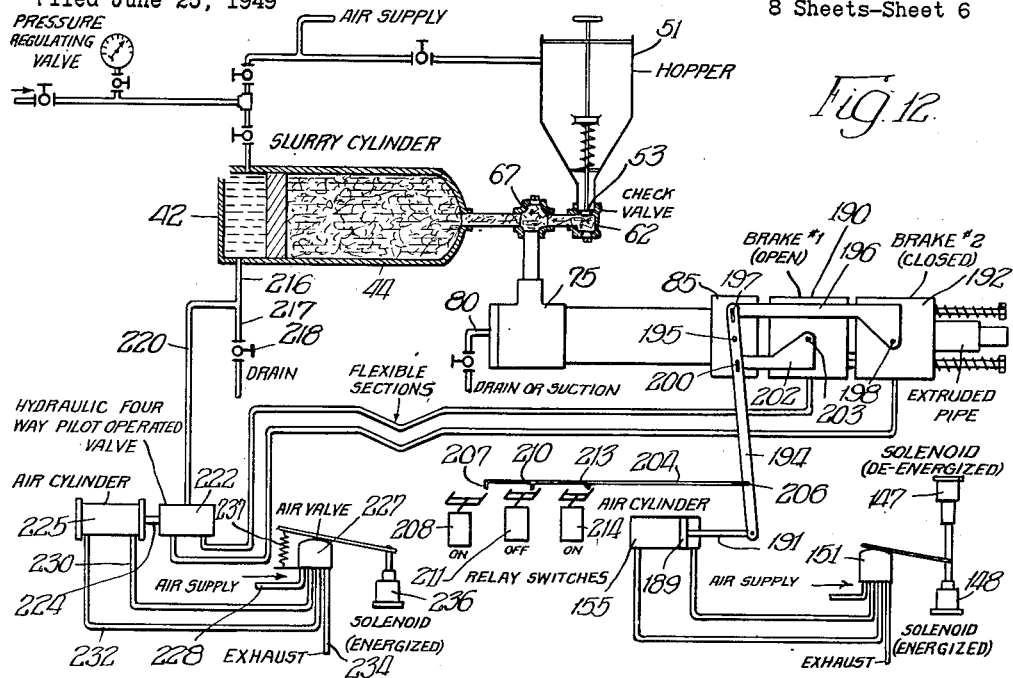
Figure 12 is a view generally similar to Figure 1 but showing a modified form of construction.
Figure 17:
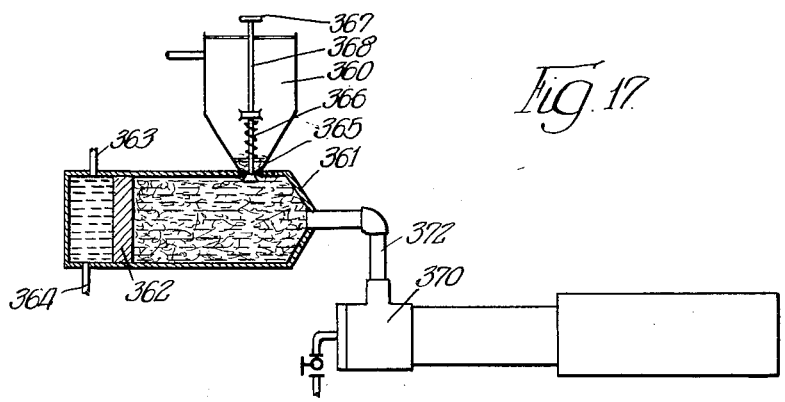
Figure 18:
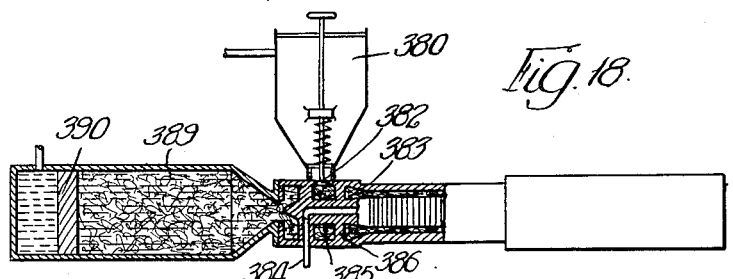
Figure 19:
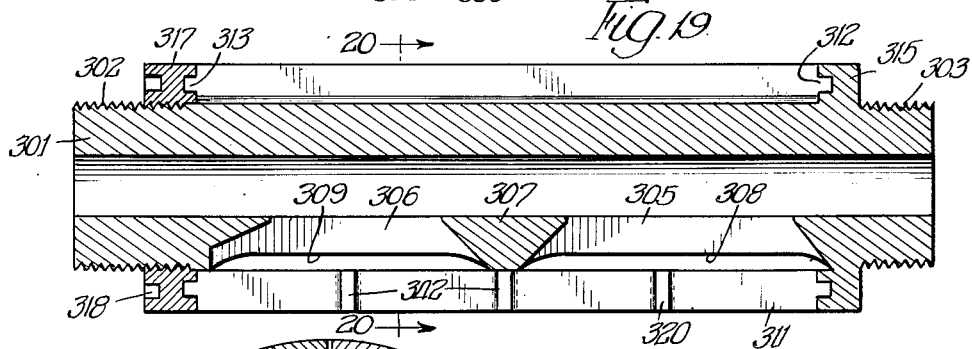
Figure 20:
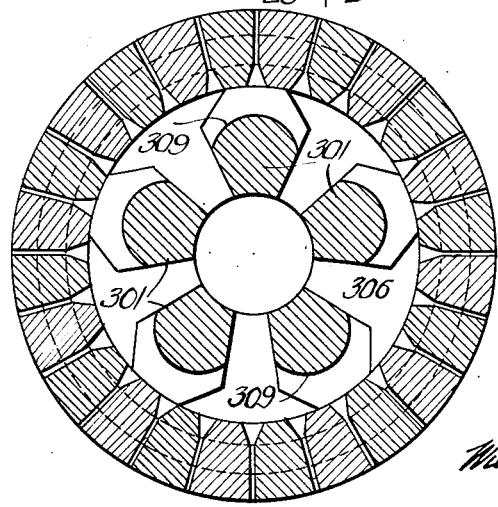

Figures 13 to 16 inclusive are fragmentary diagrammatic views showing the successive operating positions of the double brakes of Figure 12;

Figure 17 is a fragmentary view, partly in section, showing a different construction for feeding slurry to the slurry cylinder;

Figure 18 is a view similar to Figure 17 showing a construction for feeding slurry direct to the pressure chamber;

Figure 19 is a longitudinal section of a modified form of water-removal cylinder;

Figure 20 is a cross-section, on an enlarged scale, taken on line 20—20 of Figure 19;

Figure 21 is a fragmentary longitudinal section showing a modified form of construction for removal of water from the external surface of the formed material; and Figure 22 is a cross-section taken on line 22—22 of Figure 21.

Referring first to the form of construction shown in Figures 1 to 6 inclusive, a supply pipe 21 is provided to carry water or other suitable fluid under pressure. In actual operation, a pressure of approximately one thousand pounds to a square inch has proven satisfactory, but will be understood that the pressure may be varied depending upon such factors as the particular composition of material being used, the proportion of water present or the desired density of the final product. This supply pipe 21 is connected through T 22 to the pipe 24 which leads to the T 25. The opposite side of T 22 leads through relief valve 27 to the stack 28. This stack 28 is shown with a pressure gauge 29. The opposite sides of the T 25 lead to the hydraulic valves 31 and 32. An outlet pipe 33 controlled by valve 34 leads from hydraulic valve 31 to the open tank 35. The hydraulic valve 32 has an outlet pipe 37 which is connected to pressure gauge 38. This pipe 37 terminates in a T 39. From the T 39 the pipe 40 controlled by valve 41 leads to the pressure or water end 42 of the slurry cylinder 44. The opposite side of T 39 leads through valve 45 to pipe 46. The air supply pipe 47 enters pipe 46, the air supply being operatively controlled by valve 48. A further control valve 49 is located in pipe 46 which leads to the slurry hopper 51.

The slurry hopper 51 is provided, at its lower end, with a check valve 53 normally held upward or in its closed position by a spring 54 fitted around the valve stem 56. One end of the spring 54 bears against the member 57 fixedly secured to valve stem 56, while the other end of the spring engages a spider 59 located in the hopper. The valve stem 56 is provided, at its upper end, with a head 60. As shown in Figure 1, the hopper 51 is shown as closed by cover 52, which engages the valve stem head 60 to depress the valve stem 56 and open the valve 53. The cover 52 is removable.

The lower end of hopper 51 discharges into a T-fitting 62, the opposite opening of which is closed by plug 63. The lateral opening in the T 62 is connected by pipe 65 to a cross-fitting 67, the upper opening of which is closed by plug 69. The left lateral side of the cross-fitting 67 is connected by pipe 71 to the slurry end of the cylinder 44. The lower side of the cross-fitting 67 is connected by pipe 73 to the pressure chamber 75.

The mandrel 77 is fitted in the pressure chamber 75, as best shown in Figure 7, with its left end threaded into the circular flange 78 which forms a part of the left end closure 79 of the pressure chamber. This mandrel 77 is hollow and a drain pipe 80 is connected through the closure member 79. The water-extraction cylinder 82 forms a part of the mandrel 77 and beyond this cylinder 82 is a further extension 83 of the mandrel. The housing member or die 85 encloses the mandrel, being threadedly connected at 86 to the right side of the pressure chamber 75. The brake assembly 87 is located to the right of the housing 85 and is normally maintained in the left-hand position, in which it is shown in Figure 7, by means of the springs 88 surrounding the rods 89. These rods 89 extend from the right face of member 85. The springs 88 engage adjustable nuts 90 carried by the rods 89, the adjustment being maintained by lock nuts 91.

The brake construction is shown in longitudinal section in Figure 7 and in cross-section in Figure 8 and the brake shoes 95 are hydraulically operated in their gripping action and returned to the outer or unclamped position by means of springs 97. The brake assembly housing 94 houses four similar brake shoes 95, each of which engages substantially 90° of the formed pipe or the slurry support sleeve, as will be described in detail hereafter. Each shoe 95 has studs 96 threaded therein. A spring 97 surrounds each stud 96 fitting within a recess 98 in the housing 94 and having its upper end bearing against a washer 99 held in adjusted position by the nuts 100. These studs and springs normally urge the shoes 95 in their retracted positions away from the mandrel. Intermediate the studs 96, as best shown in the upper right portion of Figure 7, there are provided the pressure plates 102 carrying the cup-shaped seals 104. These seals 104 are held in place by plates 105 and screws 106. The plates 102 thrust against the shoes by means of balls 107, thus eliminating binding of the parts. These pressure shoes are also shown in cross-section in the lower part of Figure 8, and it will be noted that the chambers above the shoes are inter-connected by means of channels 108 formed in housing 94. Cover members 109 are bolted in place to cover these various chambers and the lowermost cover plate 109 is shown in Figures 7 and 8 as connected to the pipe 110 for the introduction of fluid under pressure.

It will be noted, from an examination of Figure 8, that the inner faces 112 of the brake shoes 95 are shown as serrated so as to have an increased gripping surface contacting the formal pipe. While this serration is not essential, it is desirable to have a surface having a high coefficient of friction either due to surface treatment or the nature of the material. The outer face of a portion of right-hand section 83 of mandrel 77 is also shown as serrated or knurled as shown at 113. This, also, is not essential, but it is preferable to have a surface having a relatively high coefficient of friction. In Figure 7, there is shown extending from a point covering the water drain cylinder 82 to a point adjacent the right-hand end of the mandrel 77 a slurry support sleeve 114 which is used only when beginning operation of the apparatus, as will be explained hereafter. This support sleeve 114 is shown as comprising two end rings 115 between which is a longitudinally extending inner tubular member 116 which is preferably formed from a synthetic resin reinforced with textile fibres and an outer tubular member 117 formed of rubber or similar material.

An automatic operating control is provided for the apparatus, this control operating continuously in a sequence of operations to produce the pipe by a series of intermittent movements of the pipe to the right over the mandrel 77. This control system comprises the use of air under pressure with the air valves being operated by means of solenoids, which solenoids are operated by means of relays. The relays are controlled by switches actuated by pressures and by the moving parts, as shown in Figure 1.

The hydraulic valves 31 and 32 are operated by means of air under pressure supplied to the valves from the air valve 120 by means of pipes 122 and 123. Pipe 122 is provided with branch 124 leading to the low side of air cylinder 125 which actuates hydraulic valve 32. This pipe 122 is also provided with a branch 127 leading to the high side of air cylinder 128 controlling hydraulic valve 31. The pipe 123 is provided with a branch 130 leading to the high side of air pressure cylinder 125 and with a second branch 131 leading to the low side of air cylinder 128. Valve 120 serves to connect the air pressure supply line 133 alternately to pipes 122 and 123, each pipe when not connected to the air supply line 133 being connected to the air exhaust pipe 134. This air valve 120 is actuated in the downward direction by means of the pull of solenoid 136 through lever 137. The return spring 138 serves to reverse the movement of the lever 137 when the solenoid 136 is de-energized.

The circuit diagram in Figure 2 shows the solenoid 136 and the relay 139 which serves to actuate that solenoid. This relay is controlled by switch 141. This switch 141 is shown in Figure 1 as operated by a lug 142 carried by slide rod 143 which is connected to the brake operating lever 145 and reciprocated by the movement of that lever. The solenoids 147 and 148, shown at the lower right of Figure 1, are also shown in the circuit diagram of Figure 2. These solenoids 147 and 148 are alternately energized and serve to positively move the rod 149 which operates air valve 151. This air valve 151 alternately supplies air under pressure from air supply line 153 through pipe 154 to the right end of the air cylinder 155 and similar air under pressure to the left end of cylinder 155 through the pipe line 157. Whichever of the pipes 154 and 157 is not connected to the air supply line 153 is connected to the air exhaust line 158 in the operation of the valve.

The solenoid 147 is put in operation by relay 160 controlled by a switch 161 which is adjacent switch 141 and is operated by lug 162 on the reciprocating rod 143. Solenoid 148 is controlled by relay 164 which is put in operation by means of switch 166. Switch 166 in the circuit of Figure 2 is the pressure switch shown at approximately the middle of Figure 1 and is actuated by water pressure passing through pipe 167 from the water end of the slurry cylinder 44. This switch 166 is a double-throw switch and the spring 168 normally moves such switch 166 against contact 170 when the water pressure is low in the slurry cylinder. This movement of the switch 166, as shown in Figure 2, energizes relay 164, the closing of this relay in turn energizing solenoid 148 while opening relay 160 and de-energizing solenoid 147 and, consequently, causing a reverse or downward movement of the rod 149 with consequent reversal of the flow of air through valve 151.

The circuit diagrams of Figures 2, 4 and 6 show the line wires 172 and 173 of a usual power supply circuit. The protective fuse 175 leads from line 173 through the main switch 176 to line 177 which leads to one side of the switches controlling relays 139, 160 and 164. The opposite sides of these switches 139, 160 and 164 are connected through the solenoid-operating coils 136, 147 and 148 into the other side 172 of the power line system. A second line 179 leading from the main power line switch 176 is controlled by a secondary switch 180 to supply current through switches 161, 166 and 141 to the operating coils of the relays 139, 160 and 164. The other sides of these relay coils are connected by wire 182 to the other line 172 of the power supply circuit. A pilot light 183 is shunted across switch 161 and the actuating coil of relay 160 and serves to indicate the operation of switches 161 and 166.

As shown in Figures 1 and 7, the lever 145 is pivoted at 185 to the housing 85 and has a shorter lever arm 186 extending above the pivot. This lever arm 186 is connected by a link 188 to the brake housing 94. Consequently, movement of the piston 189 in air cylinder 155 serves, by means of the piston rod 191 connected to the lower end of lever 145, to reciprocate the brake housing and the brake parts contained therein longitudinally of the mandrel 77. It is to be noted that this movement when to the right, in Figures 1 and 7, is opposed by the springs 88 which, however, assist in returning the brake assembly to the left upon movement of the piston 189 to the right. The guide rods 89 are secured to the housing 85 and the brake housing assembly 94 slides thereon.

The form of construction shown in Figures 12 to 16 inclusive provides a pair of brake assemblies which are used alternately so that the substantially continuous movement and control of the formed pipe is facilitated. The assembly shown in Figure 12 does not include the supply lines and associated parts for supplying water under pressure to the left end of slurry cylinder 44, since these portions of the construction are similar to those shown in Figure 1. The left or water end of the slurry cylinder itself, the hopper 51, check valve 53, T 62, cross connection 67 and associated parts including the pressure chamber 75 and fluid drain 80, are also identical with the constructions shown in Figure 1.

The operating mechanism comprises a pair of brakes, brake #1 being shown at 190 and brake #2 at 192. The operating lever 194 for these brakes is pivoted at 195 to the housing member 85. The link 196 is connected by slotted connection 197 to the upper end of lever 194 and is pivotally connected at 198 to the second brake 192. The slotted connection 200 joins the lever 194 and link 202 at a point below the pivot 195, the link 202 being pivoted at 203 to the first brake 190.

The slide rod 204 is pivotally connected at 206 to a lower portion of lever 194. This slide rod 204 is provided with lug 207 for operating switch 208, with lug 210 for operating switch 211, and with lug 213 for operating switch 214. The lower end of lever 194 is connected to a piston rod 191 identical with that shown in Figure 1, this rod being connected to piston 189 in cylinder 155. This cylinder is operated through pipes and by means of valve 151 and solenoids 147 and 148 in the same manner as shown in Figure 1.

The pipe 216 leads from the water end of the slurry cylinder 44 and connects through pipe 217 controlled by valve 218 to a drain. It connects by pipe 220 to a multiple valve 222, which valve is operated by a piston having the piston rod 224 extending from air cylinder 225. The air valve 227 controls the flow of air supplied through pipe 228. This air is supplied alternately through pipe 230 to the right end of cylinder 225 and through pipe 232 to the left end of the same cylinder. The valve also connects whichever end of the air cylinder is not connected to the air supply to an air exhaust line 234. The valve 227 is actuated in one direction by solenoid 236 and is returned to its opposite position by spring 237.

Figure 13:
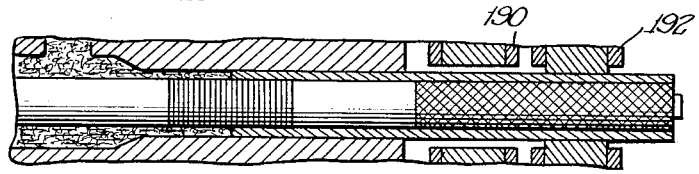
Figure 14:
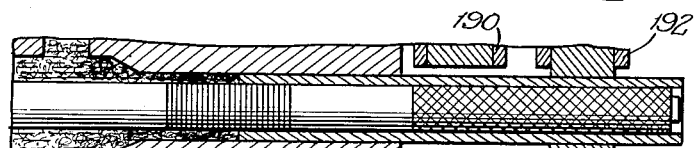
Figure 15:
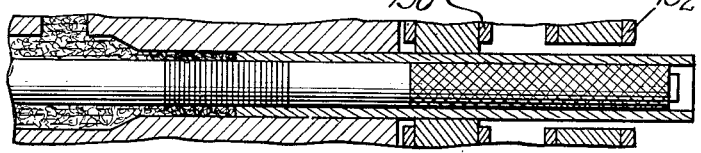
Figure 16:
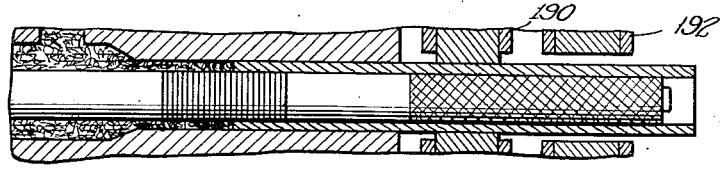

The manner in which the gripping action and movement of the two brakes are coordinated is shown in Figures 13 to 16. As shown in Figure 13, the first brake 190 is open and the second brake 192 is in its closed or gripping position. The brakes are located adjacent each other. In Figure 14, the first brake has begun its movement to the left, while the gripping second brake 192 has begun its movement to the right carrying with it the slurry support sleeve or the pipe, depending upon the period of operation. As shown in Figure 15, the second brake 192 has completed its movement to the right and the shoes have been withdrawn to the open position. At this time, the first brake 190 has closed and is now gripping the pipe or slurry support sleeve. In Figure 16, the first brake 190 is still in the closed position and is moving to the right towards the second brake 192. This second brake is still open and is moving to the left towards the first brake. The next position in the cycle is shown in Figure 13 where the two brakes have reached positions closely adjacent each other and the first brake has released while the second brake 192 has gripped.

Figures 17 and 18 show alternate forms of construction which provide for the introduction of the slurry into the system at points differing from the introduction as shown in Figures 1, 3, 5 and 12. In Figure 17, the slurry feed hopper 360 feeds directly into the slurry end of the slurry cylinder 361. This cylinder is similar to those shown in Figures 1, 3, 5 and 12 and is provided with a floating piston 362, pipe 363 for the introduction of water under pressure, and pipe 364 for the relief of the pressure and for the drainage of water from the cylinder. The hopper 360 is similar in construction to that shown in the other figures, being provided with the check valve 365 normally held closed by spring 366. This valve is opened in the manner previously described by pressing down on the knob 367 on the valve rod 368, this pressure being applied by fitting a cover tightly on the hopper when the slurry is to be introduced. The slurry cylinder 361 is shown as feeding the slurry under pressure into the pressure chamber 370 through the pipe connections 372. The particular construction of the means for dewatering the slurry and withdrawing the water and air may take the form of any one of the various constructions illustrated in the other figures.

In Figure 18, the slurry hopper 380, with its valve 382, feeds directly into the pressure chamber 383. The mandrel 385 is shown as supported on vanes 386, the circumference of the mandrel being reduced at the point where it extends opposite the valve 382. The pipe 388 for withdrawing water and air from the mandrel extends through one of the vanes 386 to the outside of the pressure chamber. It will be understood that the vanes 386 are widely spaced to offer a minimum of obstruction to the slurry while supporting the mandrel 385.

One form of the water-removing cylinder is shown in detail in Figures 9 to 11 inclusive. This cylinder comprises a central member 240 which has a central cylindrical opening 241. Member 240 has a reduced threaded portion 243 at the left end and a shorter threaded portion 244 at the right end. The right end is provided with the integral cylindrical shoulder 246. The plurality of rings 248 are assembled on the supporting member 240 against the shoulder 246 and held in position by the locking ring 250 which is threaded onto the left end of the member 240. This locking ring 250 is shown as provided with the recesses 251 for the application of a suitable wrench to be used in tightening up the assembly. As shown in Figure 11, the member 240 is provided with a plurality of longitudinally extending slots 252 which lead from the under face of the rings 248 to the central passage 241. The member 240 is provided with a longitudinally extending rib 254 which fits into notches 255 formed in the several rings 248. Each ring 248 is provided on one face with a plurality of lands or raised places 257 alternating with smaller raised places 258 which separate the major portion of the adjacent faces of the rings. These rings are all placed on member 240 with the lands all facing in the same direction so that the lands space the rings 248 apart to provide narrow slits for the passage of water. As shown in Figure 10, the inner edges of the rings are chamfered at 260 to provide for free movement of the water to the passage 241.

Another form of water-removing cylinder has been shown in Figures 19 and 20. This cylinder comprises a body member 301 having threaded ends 302 and 303. The intermediate portion of the cylinder is longitudinally slotted, as shown at 305 and 306, with a central unslotted circumferentially extending ring 307. The member between adjacent slots 305 and 306 has its circumferential surface cut away, as shown at 308 and 309, to provide clearance below the longitudinally extending bars 311. These bars 311 have lugs 312 and 313 at their ends. The lugs 312 interfit in a corresponding groove in a flange 315 extending from the end of the body member 301 adjacent the threaded portion 303. A locking ring 317 is threaded onto the threaded end 302, the lugs 313 fitting into a corresponding circumferentially extending groove as shown. Spaced openings 318 are provided in ring 317 for the use of a wrench for tightening the ring into position. As shown at 320, each of the bars 311 has, on one side, a plurality of narrow upwardly extending surfaces or lands 320. These serve to space apart the major portion of the adjacent faces of the bars 311 and provide longitudinally extending slots for the passage of water and air for dewatering the slurry. It will be understood that the threaded portions 302 and 303 serve to join the dewatering cylinder to adjacent portions of the mandrel.

A further form of construction for dewatering the slurry is shown in Figures 21 and 22. These figures show a solid mandrel 330 extending from a pressure chamber 332 into a tubular mold 333. The mold 333 is threaded at 335 onto the projection 336 of the pressure chamber, a gasket 337 being provided to effect a fluid-tight joint. A plurality of rings 340 are supported in a circumferentially extending recess in the number 333, these rings being spaced apart by lands 342 so as to provide interrupted circumferentially extending slits to permit the passage of water and air outwardly from the mold chamber 344. The outer edges of the rings 340 are chamfered, as shown at 343, to facilitate the passage of the fluids. As shown in Figure 22, these rings 340 are provided with notches corresponding to a locking bar 347 which also fits in a longitudinal slot in the member 333. This permits positive location of the rings and prevents their rotation. Water withdrawal chambers 349 are located at circumferentially spaced points around the rings 340, these chambers 349 being connected by passages 351 to the circumferentially extending collecting chamber 353. This chamber is provided with the outlet passage 355 by which the water and air may be drained off by gravity or drawn off by suction, as desired. It will be noted, from Figure 21, that the chamber 353 has its outer wall formed by a separate ring member 356 which is threaded onto the member 333 at 358, a gasket 359 being provided at the other end to secure a fluid-tight joint.

In the operation of the apparatus shown in Figures 1 to 6 inclusive for the production of pipe, a slurry or mixture of cement, asbestos and water is introduced into the system and reaches the ring-like space between the die or housing 85 and the mandrel 77. While different proportions of materials may be used, I have found that three parts of cement to one part of asbestos fibres with sufficient water to provide a fluid slurry has proven satisfactory. Pressure is applied behind the slurry, this pressure being resisted in the initial operation of the machine by the slurry support sleeve 114 which is held by the brake 94. After the process has proceeded and a length of pipe sufficiently long to extend beyond the mandrel has been produced, the slurry support sleeve is no longer used. Under these conditions, the pipe previously formed acts as a slurry support, being held by the brake 94 against the mandrel 77. Upon the slurry being compressed by the pressure applied behind it, the surplus water in the slurry is extracted through the small openings in the water-extraction cylinder 82 and is drained or drawn off by suction through the left end of the mandrel and through pipe fitting 80, shown in Figure 7. When the predetermined pressure behind the slurry is reached, the brake mechanism with the brake jaws closed moves to the right, carrying with it the extruded pipe or the slurry support sleeve. When the pressure is released behind the slurry, the brake jaws open and the brake mechanism moves to the left back to its starting position while the formed pipe or slurry support sleeve remain in their right-hand position to which they have been moved under the gripping hold of the brake. The slurry is again compressed as the brake jaws close and the operation is repeated.

The specific method of carrying out the process briefly described above is indicated in the several figures of the drawing. Referring first to Figure 1, the slurry support sleeve 114 is inserted into the open end of the extruding chambers, being slipped over the mandrel and slid in until its left end covers the major portion of the water-removing cylinder 82, as shown in Figure 7. The slurry which has been previously mixed is poured into the hopper 51. It is necessary, at this time, to close the hopper and a removable cover 52 is secured to the top of the hopper, engaging the end 60 of the valve stem 56 and forcing the valve 53 downwardly to open position. Valve 45 is closed and valves 48 and 49 are open so that compressed air is supplied to the top of the hopper 51. This forces the slurry out of the hopper and through pipe 65 to the fitting 67 where a portion of it passes into the slurry cylinder 44. Another portion passes downwardly through pipe 73 to the chamber 75 about the left end of the mandrel 77. The slurry forces the floating piston 43 to the left in the slurry cylinder 44 to substantially the position in which it is shown in Figure 1. After the slurry has been forced out of the hopper 51 by this compressed air, the air is shut off by closing valves 48 and 49 and the cover 52 removed from the hopper. The spring 54 automatically returns the check valve 53 to closed position.

To start the apparatus into operation, the main switch 176 and secondary control switch 180 are closed manually. At this point in the operation, switches 141 and 161 are in the closed position, having been left in that position by the final movement of the lower end of the lever 145 to the right in the previous operation. Switch 141, being closed, operates relay 139 to close solenoid 136 which moves the air valve 120 to the position in which it is shown in Figure 1, the valve then serving to open the hydraulic valve 32 and close hydraulic valve 31. The water under high pressure from the ram passes through valve 32 and through T-fitting 39 and pipe 40 to the water or left end of the slurry cylinder 44 behind the floating piston 43. It will be understood that the manually-operated valve 41 is opened while the upper valve 45 is closed before beginning this operation.

Water pressure thus starts to build up in the water end of the slurry cylinder 44. While this pressure is being built up, surplus water from the ram exhausts through valve 31 to the open tank 35. At the time of beginning the process, since there is no initial pressure in the water chamber behind the piston 43, the pressure switch 166 is closed against contact 170 so that relay 164 is operated to energize solenoid 148. Solenoid 148 holds the air valve 151 in such position that it provides air under pressure through line 157 and holds the piston 189 to the right and, through the piston rod 191, lever 145 and link 188, holds the brake assembly 94 at its left limit of movement.

As the slurry is compressed, some of the water is extracted from the slurry being forced by the pressure through the slits provided between the water-extraction rings 248 on the water-extraction cylinder 82 which is part of the mandrel. This water passes out through pipe 80 to a drain. This may be a gravity drain or suction may be applied to facilitate the removal of the water. When a predetermined pressure, which may be on the order of 1,000 pounds per square inch, has been reached on the water side of the floating piston 43 in the slurry cylinder 44, this pressure serves to operate the pressure switch 166 and to swing it to the left in the position in which it is shown in Figure 4. This de-energizes relay 164 and solenoid 148 and energizes relay 160 and solenoid 147. It will be understood that, at this time, switch 161 remains closed.

Solenoid 147 pulls the rod 149 upwardly to the position in which it is shown in Figure 3. This serves to reverse the flow of air through valve 151 and air behind piston 189 in cylinder 155 is exhausted while air under pressure is introduced in front of the piston. This moves the piston to the left, as shown in Figure 3. The lever 145, being pivoted at 185 and the upper end of lever 145 being connected by link 188 to the brake assembly 194, this left movement of piston 189 moves the brake assembly to the right. As the lower portion of the lever 145 moves to the left it pushes the switch-actuating rod 143 to the left and switch 141 is opened by lug 142. This switch 141 then opens the circuit to relay 139, de-energizing solenoid 136. The spring 138 reverses the position of valve 120 upon the inactivation of solenoid 136. This reverses the air supply to the two hydraulic valves 31 and 32. Valve 32 closes to the water supply and exhausts its connection 126 to the water side of the floating piston 43 and slurry cylinder 44 to the open tank 35, thus reducing the pressure in the water end of the slurry cylinder. Valve 31, also being opened, discharges to the open tank. These actions occur as the brake is moving to the right, moving with it the slurry support cylinder or the formed pipe. It will be understood that if the slurry support cylinder is being moved, the formed pipe will follow closely behind the left end of that cylinder due to the pressure in the chamber about the mandrel.

As the brake assembly reaches its limit of movement to the right, as shown in Figure 5, the piston 189 in air cylinder 155 has completed its movement to the left. The completion of this movement serves to bring lug 162 in contact with the switch-operating mechanism of switch 161 and opens that switch. At substantially the same time that switch 161 is opened, pressure switch 166 is relieved of its pressure and swings the switch 166, shown in Figures 2, 4 and 6, back to the right-hand position as shown in Figures 2 and 6. This movement of the switch 166 serves to de-energize the relay 160 and thus de-energizes the solenoid 147. This solenoid 147 thus releases rod 149, which has operated the air valve 151. This movement of switch 166 serves to energize relay 164 which energizes solenoid 148 to pull the rod 149 downwardly.

When the pressure is reduced in the water end of the slurry cylinder, it is also reduced through pipe line 110 which leads to the pressure chambers in the brake assembly and the brake shoes are released or drawn away from the formed pipe or slurry support cylinder by means of the several springs 97, as shown in Figure 8. At the same time, as stated above, pressure switch 166 engages contact 170 operating relay 164 operating solenoid 148 which operates air valve 151 to supply air in the left end of air cylinder 155 to return the open brake assembly to the left. As the brake mechanism moves to the left, the lugs 142 and 162 close first switch 161 and then switch 141 which closes relay 139 energizing solenoid 136 which, through air valve 120, again applies the water pressure through valve 32 to the water end of the slurry cylinder 44. Switch 161 closes the secondary circuit to relay 160 so that the circuit is ready to be operated by the movement of pressure switch 166 when the pressure reaches the predetermined amount. This pressure builds up in the slurry cylinder back of the slurry piston 43 and the cycle being completed, the above described steps continue in the order described.

As the operation continues automatically, the slurry support sleeve gradually works out from between the mandrel and the die and normal extrusion of the pipe takes place. As the pipe extrudes from the apparatus it is preferably supported in a trough since, while it is very hard and dense, it has not cured and should be supported until the cement has set and the pipe is fully cured. The slurry cylinder may be refilled with slurry from time to time in the manner described whenever the slurry has become used up in the operation. It will be understood that the slurry cylinder may be made of such a size as to produce a very substantial length of pipe without refilling. Once the process has started it may be continued indefinitely without again using the slurry support sleeve. The pipe, as extruded, is entirely continuous and may be cut in any suitable lengths as desired for use.

When the slurry is mixed, there will be a certain amount of air entrained with the slurry in the mixing operation. This entrained air has proven to be a desirable factor in the carrying out of the process. The other constituents of the slurry, the water, cement and asbestos, are substantially non-compressible. The air, however, is of course highly compressible, thereby serving as a cushion, and this assists in the smooth movement of the floating piston 43 in the operation of forming the pipe. Due to the high pressures used, the entrained air is forced out of the slurry with the major portion of the water and passes through the narrow slits between rings 248 of the water-extraction cylinder, the air thereby having a cleansing effect in keeping the slits open. This cylinder has been made with slits having a width of from five to ten one-thousandths of an inch and, in this range, has proven highly effective. The water and air pass out of the slurry through the slits, the water carrying with it in suspension only a very small portion of the more finely divided cement. This leaves only an extremely dense mixture of cement and asbestos fibres, together with a small amount of water to pass by the water-extraction cylinder 82. The process and apparatus, therefore, form a hard, dense pipe which, when fully cured, has high tensile and compressive strength. The pipe is also not as brittle or subject to fracture by careless handling, as is cast cement pipe made under atmospheric pressure.

While I have shown certain preferred embodiments of my invention, they are to be understood to be illustrative only as it is capable of variation to meet differing conditions and requirements, and I contemplate such modifications as come within the spirit and scope of the appended claims.

I claim:

1. The method of producing continuous compacted composition shapes by extrusion molding which comprises forcing the composition under pressure into an open-ended die, periodically gripping said composition in the die to hold it against movement due to the applied pressure, positively pulling the compacted composition through the die during the gripping action, and periodically releasing said gripping action.

2. The method of producing continuous compacted composition shapes from compositions containing entrained liquids which comprises forcing the composition under intermittent applied and released pressure into an open-ended die, withdrawing a substantial portion of the entrained liquid from the composition in the die, periodically gripping the composition from which the liquid has been withdrawn to restrain it against movement due to the applied pressure, and periodically releasing said gripping action when the pressure is released.

3. The method of producing continuous compacted composition shapes from compositions containing entrained liquids which comprises forcing the composition under pressure into an open-ended die, withdrawing a substantial portion of the entrained liquid from the composition in the die, periodically gripping the composition from which the liquid has been withdrawn to restrain it against movement due to the applied pressure, positively moving the composition from which the liquid has been withdrawn during the gripping action, and periodically releasing said gripping action.

4. The method of producing continuous solid shapes by extrusion molding which comprises applying pressure to a cement slurry in a pressure chamber, forcing the slurry into a continuous die, withdrawing a substantial portion of the water from the slurry in the die, periodically restraining movement of the dewatered material through the die and positively moving the formed material through the die between periods of restraint.

5. The method of producing continuous solid shapes by extrusion molding which comprises applying pressure to a cement slurry in a pressure chamber, forcing the slurry into a continuous die, withdrawing a substantial portion of the water from the slurry in the die, periodically restraining movement of the dewatered material through the die and positively gripping and moving the formed material through the die between periods of restraint.

6. The method of producing continuous compacted shapes by extrusion molding which comprises introducing air into a cement slurry, periodically applying pressure to the aerated slurry in a pressure chamber, forcing the slurry into a continuous, open-ended die, withdrawing a substantial portion of the air and water from the slurry in the die, and periodically restraining movement of the material through the die.

7. The method of producing continuous compacted shapes by extrusion molding which comprises introducing air into a cement slurry, periodically applying pressure to the aerated slurry in a pressure chamber, forcing the slurry into a continuous, open-ended die, withdrawing the major portion of the air and water from the slurry in the die, positively gripping the dewatered and deaerated material periodically in the die and while gripping said material positively moving the slurry through the die.

References Cited in the file of this patent

UNITED STATES PATENTS

| Number | Name | Date |
|---|---|---|
| 277,593 | McMahon | May 15, 1883 |
| 410,977 | Keyes | Sept. 10, 1889 |
| 454,030 | Clark | June 16, 1891 |
| 1,370,800 | Egerton | Mar. 8, 1921 |
| 1,445,724 | Skorkovsky | Feb. 20, 1923 |
| 1,649,892 | Daniels | Nov. 22, 1927 |
| 1,870,279 | Bryant | Aug. 9, 1932 |
| 1,949,472 | Hopkinson | Mar. 6, 1934 |
| 2,027,657 | Van Roggen et al. | Jan. 14, 1936 |
| 2,122,376 | Mason | June 28, 1938 |
| 2,257,573 | Randall | Sept. 30, 1941 |
| 2,309,206 | Newman | Jan. 26, 1943 |
| 2,332,170 | Sapp | Oct. 19, 1943 |
| 2,428,555 | Cummins et al. | Oct. 7, 1947 |
| 2,434,690 | Ferla | Jan. 20, 1948 |
| 2,549,686 | Hjulian | Apr. 17, 1951 |
| 2,554,968 | Thompson | May 29, 1951 |
| 2,598,913 | Hjulian | June 3, 1952 |

FOREIGN PATENTS

| Number | Country | Date |
|---|---|---|
| 401,428 | Great Britain | Nov. 16, 1933 |